March 12, 1929.  W. R. DAY  1,704,700
PISTON AND PISTON RING

Filed Dec. 13, 1924

INVENTOR
William R. Day
BY
C. T. Heinkel,
ATTORNEY

Patented Mar. 12, 1929.

1,704,700

UNITED STATES PATENT OFFICE.

WILLIAM R. DAY, OF CLEVELAND, OHIO, ASSIGNOR TO THE GUARDIAN TRUST COMPANY, TRUSTEE, OF CLEVELAND, OHIO, A CORPORATION OF OHIO.

PISTON AND PISTON RING.

Application filed December 13, 1924. Serial No. 755,610.

My invention relates to piston and piston-ring structures.

In this specification and in the claims appended thereto, I use the expressions "compressed gas" and "pressure" and means thereby either compressed air, or compressed fuel gas, or steam, or other gas or other substances suitable for use in any particular or general engine unless the nature of the gas is definitely set forth. I also use the expression "gas" and mean thereby either of the gases and substances set forth above.

One of the objects of my invention is a piston and piston-ring structure in which no spring means is required in or on the piston-ring.

Another object is to force a piston-ring onto the wall of a cylinder in which the ring operates by the pressure of the gas in this cylinder and to limit the pressure of this gas on the piston-ring to avoid unnecessary friction.

Another object is to force a piston-ring onto the side walls of the piston groove in which the piston-ring operates by the pressure of the gas or by a vacuum in the cylinder in which the piston operates.

Another object is to provide a split piston-ring with a joint which is sealed by pressure or by vacuum in the cylinder in which the piston-ring operates.

Another object is a piston and piston-ring structure which effectively seals the piston against high pressures in a cylinder.

Another object is a piston and piston-ring structure which effectively seals the piston in a cylinder without creating unnecessary friction between the ring and the cylinder wall.

Broadly speaking, the present invention aims to provide a piston and piston-ring structure which seals the piston in a cylinder by utilizing the pressure in this cylinder, either partly or wholly, to press the piston-ring against the wall of this cylinder and against the walls of the piston-ring groove in the piston with just sufficient force to prevent leakage and without creating unnecessary friction between the piston-ring and the wall of this cylinder.

My invention is illustrated in the accompanying drawing which shows two types of piston and piston-ring structures and in which:—

Similar reference characters refer to similar parts throughout the views.

Figure 1:
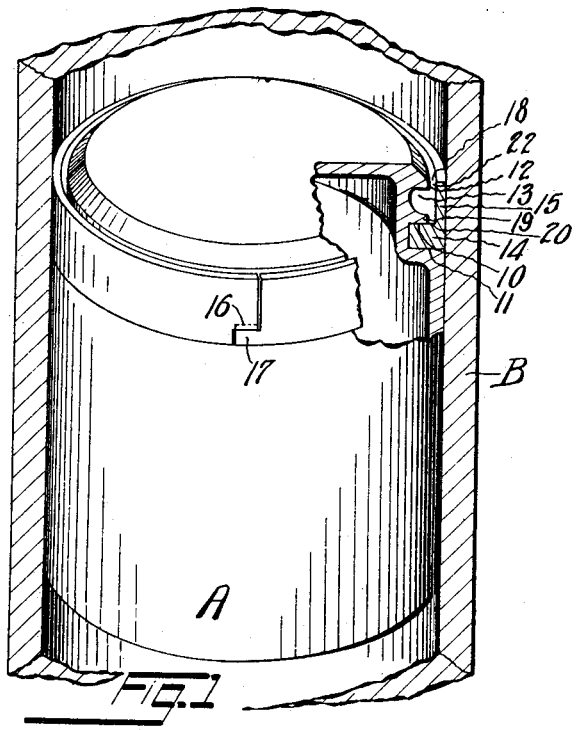
Fig. 1 is a perspective view of a piston with one piston-ring mounted therein, embodying the features of my invention, and partly in section to clearly show the section of the piston-ring and the expansion chamber and the relation of the piston-ring to the piston and to this expansion chamber.

Referring now particularly to Fig. 1. The piston A is here shown with one piston-ring groove having the walls 10 and 11. The upper end of the piston is reduced in diameter, thereby providing the recessed wall 12. The expansion chamber 13 is recessed in this wall 12 and, in the present instance, extends all the way around this reduced end of the piston.

Figure 2:
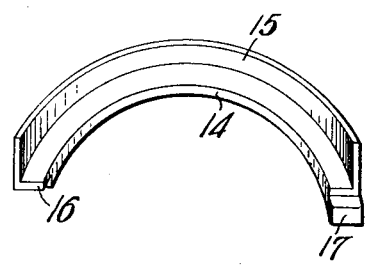
Fig. 2 is a perspective view of one section of a three piece piston-ring, showing the lap joints thereof in relation to the body part thereof.

The piston-ring used here is made in three sections, one of the sections is shown in Fig. 2, each section is a duplicate of the others, and the three sections are formed and jointed to virtually constitute a complete piston ring.

Figure 3:
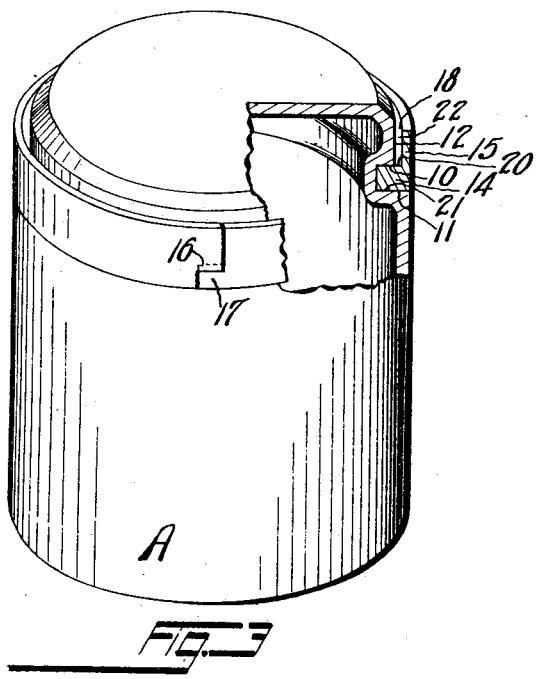
Fig. 3 is a perspective view of a piston with one piston-ring mounted therein, also embodying the features of my invention, partly in section to clearly show the section of the piston-ring and the relation thereof to the piston.

The structure shown in Fig. 3 is similar to that shown in Figs. 1 and 2 except that the expansion chamber 13 is absent in Fig. 3. Therefore, the explanation of the piston-ring structure of Figs. 1 and 2 also apply to Fig. 3.

This jointed piston-ring comprises the body portion 14 and the flange portion 15 which is tubular and extends upward from the portion 14.

One end of each section of the piston-ring is provided or formed with a recess in the body or base portion 14 thereof thereby leaving the lap 16 on this end. The other end is provided or formed with the projection 17 of approximately the same size as the recess on the opposite end. When the three sections are assembled, the lap 16 of one section is disposed over the projection 17 of the adjacent section as seen in Figs. 1 and 3.

When the piston-ring is assembled in the piston, the flange 15 is spaced from the wall 12 to provide the space 22 ending in the port 18 at the upper end of the ring. The flange 15 extends up to the end of the wall 12 in Fig. 1 while this flange extends not quite to the end of the wall 12 in Fig. 3. The disposition of the end of the flange 15 in relation to the end of the wall 12 is best determined by requirements of any particular piston and the pressure in the cylinder.

As seen in Fig. 1, the expansion chamber 13 does not extend way down to the wall 10, thereby providing the toe 19 and preserving the full width of the wall 10.

The structure shown in Figs. 1 and 3 can be applied to explosive engines, or oil burning engines, or steam engines, or other pressure engines which have parts similar to piston and piston-rings and which parts need sealing.

As to general operation of the structure shown and described:—When the piston and piston-ring shown is inserted into the cylinder B, the piston-ring rests lightly on the wall of the cylinder with practically no friction between this wall and the ring as long as the engine runs idle.

When a pressure exists in the cylinder, above the piston, some of this pressure enters the port 18 and fills the space 22; this pressure then forces the ring sections outward against the wall of the cylinder to prevent leakage there.

In gas explosion engines, as well as in fuel burning engines, a very high pressure is created above the piston at certain stages of the stroke which high pressure would force the ring sections against the cylinder wall with sufficient force to create too much friction there if not regulated and thereby practically act as a brake.

In order to prevent this high friction, I proportion the port 18 so that only a small quantity of this high pressure enters the space 22. After this high pressure has passed the port 18, it enters the expansion chamber 13, thereby reducing the pressure against the inner surface of the flange 15.

It is observed here that, in addition to restricting the admission of the pressure through the port 18, the inner area of the flange 15 can also be so proportioned that the ring sections can be forced or held against the cylinder wall with any desired force. For instance, if it is desired that the ring sections are to be held against the cylinder wall with a force of ten pounds and the pressure in the cylinder is twenty pounds, the area of the inner surface of the flange should be one half of the area of the outer surface of the piston-ring. This illustration is, of course, rough only and not strictly in compliance with engineering rules but is mentioned here only to convey my idea of proportioning the piston-ring to get best results. This proportioning of the piston-ring can also be carried out effectively without restricting or otherwise acting on the pressure either while the same enters the port 18 or thereafter.

Taking a concrete example to explain the action of my piston and piston-ring structure, I will describe this action as it takes place in a gas explosion engine; it being understood that the present piston and piston-ring structure acts in a similar manner in other engines.

In a four cycle gas explosion engine we have a suction stroke, a compression stroke, and a power stroke.

When the piston first moves downward on the suction stroke, there is sufficient pressure in the combustion chamber to hold the piston-ring sections against the cylinder wall. Due to the friction between the piston-ring and the cylinder wall, the portion 14 of the ring is forced against the wall 10 of the groove in the piston, thereby sealing the joint there. The partial vacuum created in the cylinder by this suction stroke extends into the space 22 and thereby exerts a suction action on the flange 15 and on the face 20. Since the flange 15 bears against the cylinder wall without any air therebetween, this suction action has no effect on the piston-ring radially but, since the face 21 is now relieved from the wall 11, this suction action helps to hold the body 14 against the face 10, thereby effectively sealing the piston on the suction stroke.

When the piston first starts to move upward on the compression stroke, there is practically no pressure in the cylinder. As soon as the piston starts to move upward, pressure is created in the cylinder which pressure is very light at first and continues to increase as the piston travels upward. This compression pressure in the cylinder is formed gradually during the entire upward movement of the piston and gives this pressure sufficient time to enter the space 22 gradually and thereby forces the ring sections against the wall of the cylinder with nothing more than the force exerted thereon by this gradually increasing pressure, thereby sealing the piston on the cylinder wall without undue pressure and without creating more friction than necessary.

It is noted here that the port 18 may also be proportioned so that the full final compression pressure does not act on the piston-ring when so desired.

When the piston is so moving upward on the compression stroke, the friction between the flange 15 and the wall of the cylinder forces the body 14 of the ring onto the wall 11 of the groove in the piston and, in addition thereto, the increasing pressure in the cylinder acts on the face 20 as well as on the square end of the flange 15, thereby further holding the body 14 onto the wall 11 and producing an effective seal there.

The above action on the face 20 also acts on the lap 16 of each piston-ring section and forces them down upon the projections 17 of the adjacent sections and thereby seals the lap joint.

When the piston is at the beginning of its power stroke, the compressed gas explodes and thereby suddenly increases the pressure in the cylinder. If no provision is made to exclude this increased pressure from the inside of the piston-ring, the ring sections will be forced against the cylinder wall with more force than necessary and thereby create unnecessary friction and decrease the efficiency of the engine.

In the present invention, the port 18 is just sufficiently large to admit sufficient pressure to the space 22 to press the ring sections against the cylinder wall with the desired pressure but is not sufficiently large to instantly admit the full explosion pressure to this space as previously explained. Therefore, before this high pressure can fill the space 22, the piston has traveled some distance and thereby decreased the pressure in the cylinder before this high pressure has a chance to act on the ring sections with its full force.

The principle explained in the last paragraph, in connection with the high pressure, can also be carried out in the same manner in connection with the compression pressure. As is well known, the compression pressure increases very rapidly toward the end of the compression stroke, therefore, the port 18 can be proportioned so that the full final compression pressure does not act on the piston-ring sections.

When the space 22, as shown in Fig. 3, is not sufficient to reduce the pressure on the ring sections to a desired degree, I introduce the expansion chamber 13 (Fig. 1) in connection with the space 22 and with the port 18. In this instance, the port 18 and the space 22 accomplish the same purposes as previously explained and the chamber 13 is added to provide more volume to the space 22 so that the piston will travel further before the pressure in the space 22 and in the chamber 13 is equal to the pressure in the cylinder. By the time the piston has traveled far enough to so equalize the pressure, the higher pressures first created in the cylinder, either by explosion or by compression, have expanded and are not now sufficiently great to force the ring sections against the cylinder wall with unnecessary pressure.

Although the port 18 is shown of the same width as the space 22, it is understood that this port may be narrower than the space 22 or may be restricted in area in other manners.

It is observed that the present invention provides a piston and piston-ring structure in which the piston-ring sections are forced against a cylinder wall with a force equal to the pressure in the cylinder at some stages of the travel of the piston and with less than the pressure in the cylinder at other stages of this travel of the piston.

The present invention seals a piston in a cylinder against high pressures and does so without creating unnecessary friction between the piston ring and the cylinder wall.

I am aware that pistons have been made with reduced ends and with piston-rings having a flange disposed over this reduced end; therefore, I do not claim such feature broadly but I do claim the improvements thereon as set forth in this specification and included in the claims appended thereto.

I am also aware that modifications, other than those shown and described and pointed out, may be made within the scope of the appended claims; therefore, without limiting myself to the precise construction and arrangement of elements shown and described and pointed out,

I claim:—

1. A cylindrical member and a member to be sealed therein, a ring mounted in said member to be sealed and radially expansible by means of fluid pressure, a portion of said ring spaced from said member to be sealed, one end of said space being open, and said open end proportioned to limit the quantity of fluid pressure admitted into said space.

2. In combination, a piston provided with a reduced end and with a ring groove adjacent this reduced end and with an expansion chamber in this reduced end, and a radially split piston-ring comprising a body portion disposed in said groove and a flange portion disposed over said reduced end and spaced therefrom radially.

3. In combination, a cylinder, a piston in said cylinder and provided with a reduced end and with a ring groove adjacent this reduced end and an expansion chamber in this reduced end, a radially split piston-ring comprising a body portion disposed in said groove and a flange portion disposed over said reduced end and spaced therefrom radially to form a chamber open at the outer end of said reduced end, and said open end of the chamber adapted to admit the full pressure of said cylinder into said chamber at some stages of the travel of the piston and less than this full pressure at other stages of this travel.

4. In combination, a cylinder, a piston in said cylinder and provided with a recessed portion and with a ring groove adjacent this recessed portion and with an expansion chamber in this recessed portion, a radially split piston-ring comprising a body portion disposed in said groove and a flange portion disposed over said recessed portion and spaced therefrom radially to augment said expansion chamber, and port means for admitting the full pressure from said cylinder into said chamber at some stages of the travel of said piston and less than full pressure at other stages of this travel.

5. In combination, a cylinder, a piston in said cylinder and provided with a ring groove, a piston-ring mounted in said ring groove and divided radially into sections having opposite ends lapped over each other, a chamber between said piston-ring and said piston, and port means for said chamber and proportioned to admit sufficient pressure from said cylinder into said chamber to seal said piston in said cylinder and to seal said piston-ring in said ring groove and to seal said lap joints without creating unnecessary friction between said piston-ring and the wall of said cylinder.

WILLIAM R. DAY.